US008786249B2

(12) United States Patent
Koritarov

(10) Patent No.: US 8,786,249 B2
(45) Date of Patent: Jul. 22, 2014

(54) FREQUENCY BASED ELECTRIC VEHICLE CHARGE CONTROLLER SYSTEM AND METHOD FOR IMPLEMENTING DEMAND RESPONSE AND REGULATION SERVICES TO POWER GRID USING FREQUENCY DETECTION

(75) Inventor: Vladimir Koritarov, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 619 days.

(21) Appl. No.: 13/204,092

(22) Filed: Aug. 5, 2011

(65) Prior Publication Data

US 2013/0033234 A1    Feb. 7, 2013

(51) Int. Cl.
*H02J 7/00* (2006.01)
*H02J 7/04* (2006.01)
*H02J 7/34* (2006.01)
*B60L 11/18* (2006.01)

(52) U.S. Cl.
CPC .............. *H02J 7/04* (2013.01); *B60L 11/1816* (2013.01); *B60L 11/1838* (2013.01); *H02J 7/34* (2013.01)
USPC ........... 320/104; 320/109; 320/160; 320/107; 320/106

(58) Field of Classification Search
USPC ................. 320/104, 109, 107, 160, 128, 136; 700/291, 296, 36; 903/907; 307/102, 307/64, 44, 45, 46, 47, 48, 65, 68, 87, 84, 307/85, 75, 72, 10.1; 180/65.1, 65.21, 180/65.29; 701/22; 702/63
See application file for complete search history.

(56) References Cited

U.S. PATENT DOCUMENTS

| 3,512,013 | A | 5/1970 | Calfee |
| 4,090,090 | A | 5/1978 | Johnston |
| 4,096,395 | A | 6/1978 | Bogel et al. |
| 5,739,594 | A * | 4/1998 | Sheppard et al. ............... 307/64 |
| 6,031,298 | A * | 2/2000 | Lo et al. ........................... 307/64 |
| 6,157,136 | A | 12/2000 | Wang et al. |
| 6,341,054 | B1 * | 1/2002 | Walder et al. ................... 361/66 |
| 7,010,363 | B2 | 3/2006 | Donnelly et al. |
| 7,402,978 | B2 | 7/2008 | Pryor |
| 7,821,302 | B2 * | 10/2010 | Guiramand ...................... 327/47 |
| 7,944,673 | B2 * | 5/2011 | Kamata et al. ................. 361/194 |
| 8,183,826 | B2 * | 5/2012 | Tuffner et al. ................. 320/107 |
| 2010/0017045 | A1 | 1/2010 | Nester et al. |
| 2010/0090532 | A1 | 4/2010 | Shelton et al. |
| 2010/0289451 | A1 | 11/2010 | Tuffner et al. |
| 2010/0292855 | A1 | 11/2010 | Kintener-Meyer |

* cited by examiner

*Primary Examiner* — Edward Tso
*Assistant Examiner* — Alexis A Boateng
(74) *Attorney, Agent, or Firm* — Joan Pennington

(57) ABSTRACT

Frequency responsive charging for plug-in hybrid electric vehicles (PHEV) and battery electric vehicles (BEV), a frequency sensing charging system and a method are provided for implementing demand response and regulation services to power grid using frequency detection for a frequency-based charge controller for plug-in hybrid electric vehicles (PHEV) and battery electric vehicles (BEV). A frequency of the power grid is continuously monitored and compared to a predefined tolerance band by a frequency sensor. Responsive to the frequency being outside the predefined tolerance band, the frequency is applied to a programmable logic controller. The programmable logic controller uses the applied frequency to identify a control action. A charge controller and a switch coupled to a battery charger receive respective identified control actions for controlling the battery charger.

20 Claims, 3 Drawing Sheets

300

| GRID FREQUENCY 302 f | ACTION FLAG STATUS 304 | PROGRAMMABLE LOGIC CONTROLLER (PLC) ACTION 306 |
|---|---|---|
| 59.9 <f<60.1 | 0 | NONE (NORMAL STATE – FULLY CHARGING IF NEEDED). |
| 59.5 <f<59.9 | 0 | REDUCE CHARGING CURRENT TO 50% LEVEL, SET FLAG =1 |
| f<59.5 | 0,1 | STOP CHARGING (OPEN CHARGING CIRCUIT); SET FLAG =2 |
| f<59.7 | 2 | NONE (CHARGING ALREADY STOPPED). |
| 59.7 <f<60.0 | 2 | RESUME CHARGING WITH 50% LEVEL; SET FLAG =1. |
| 60.0 <f<60.1 | 1,2 | INCREASE CHARGING TO FULL LEVEL, SET FLAG =0 |
| f>60.1 | 0 | NONE (ALREADY CHARGING AT FULL LEVEL). |

FIG. 3

FREQUENCY BASED ELECTRIC VEHICLE CHARGE CONTROLLER SYSTEM AND METHOD FOR IMPLEMENTING DEMAND RESPONSE AND REGULATION SERVICES TO POWER GRID USING FREQUENCY DETECTION

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

The present invention relates to frequency responsive charging for plug-in hybrid electric vehicles (PHEV) and battery electric vehicles (BEV), a frequency sensing charging system and a method for implementing demand response and regulation services to the power grid using frequency detection with a frequency-based charge controller for plug-in hybrid electric vehicles (PHEV) and battery electric vehicles (BEV).

DESCRIPTION OF THE RELATED ART

With the emerging anticipated increase in the number of plug-in hybrid electric vehicles (PHEV) and battery electric vehicles (BEV), the charging of vehicle batteries is expected to add a significant amount of new load that needs to be covered by electric utilities.

The charging of these vehicles can be done in a number of ways with various voltage chargers, for example, 120 V, 240 V, or 480 V, can be used, with the advantage that the higher the voltage, the faster the charging times. Slow charging systems using 120 or 240 volt chargers are expected to be used in a residential setting or fast chargers, for example, 400V or higher, to be used in commercial charging stations.

A number of issues and concerns have arisen including the potential problems caused to the electrical transmission and generation system or power grid by charging large numbers of electric vehicles. Any power grid during its operation must always maintain a balance between the supply and demand. If the demand increases faster than the supply, the system frequency tends to decrease, and vice versa. To keep the system frequency within the narrow range around 60 Hz in the United States, or other desired value, for example, 50 Hz in some countries, is the goal of frequency regulation performed by balancing authorities and utility dispatch centers. This regulation service is performed by a large number of generating units located throughout the power grid. The system frequency is constantly monitored in dispatch centers and control signals are being sent automatically to generating units participating in regulation service to increase or decrease their power outputs as necessary in order to match the consumer demand.

In normal operation, the system frequency fluctuates very closely around 60 Hz since it is constantly monitored and adjusted by the regulation service. On rare occasions, after a forced outage of significant generating or transmission capacity, the frequency drop may be large enough to activate under-frequency relays distributed at key points within the power system. The role of under-frequency relays is to quickly disconnect certain parts of the system or some consumer loads in order to re-establish supply and demand balance. The electric utilities also have automatic load shedding procedures in place that are using under-frequency relays to curtail certain amount of consumer loads at certain predefined frequency set points. These actions are deemed necessary in order to prevent the possibility of a total system blackout caused by the severe imbalance in supply and demand.

Considering the anticipated large penetration of PHEV and BEV in the future, the research is currently going on in the direction of devising smart charging patterns in order to minimize their burden on the power grid. One proposal is that the chargers for PHEV and battery electric vehicles (BEV) would be controlled by utilities with charging mostly performed at night during the off-peak hours. The others are proposing vehicle-to-grid (V2G) technologies to provide demand response and regulation services to the power grid when needed. Both approaches would require communications or signals from the utility dispatch centers. The V2G approach would also require equipment enabling two-way power flows to provide regulation service to the power grid.

The regulation service is at present performed almost entirely by electric utilities on the supply side by constantly adjusting the power output of generating units to match the consumer demand.

A need exists for an effective charge controller for plug-in hybrid electric vehicles (PHEV) and battery electric vehicles (BEV) and a practical method of implementing demand response and regulation services to the power grid from the demand side. It is desirable to implement enhanced demand response and regulation services to the power grid by using PHEV and BEV that can substantially reduce or increase their charging load (or power draw) as needed. This would complement the supply-side regulation service and provide for safer and more reliable operation of electric power grid. The large number of PHEV and BEV that will be connected to the grid and charging their batteries at any given moment will provide a large pool of capacity on the demand side that can be used to dampen frequency fluctuations within the power system. In addition, their flexible charging load will be very useful in compensating the fluctuations in the power output of wind, solar, and other variable energy sources in the future.

SUMMARY OF THE INVENTION

Principal aspects of the present invention are to provide frequency responsive charging for plug-in hybrid electric vehicles (PHEV) and battery electric vehicles (BEV), a frequency sensing charging system and a method for implementing demand response and regulation services to power grid using frequency detection with a frequency-based charge controller for plug-in hybrid electric vehicles (PHEV) and battery electric vehicles (BEV). Other important aspects of the present invention are to provide such frequency responsive charging, system and method substantially without negative effects and to overcome some of the disadvantages of prior art arrangements.

In brief, frequency responsive charging for plug-in hybrid electric vehicles (PHEV) and battery electric vehicles (BEV), a frequency sensing charging system and a method are provided for implementing demand response and regulation services to an associated power grid using frequency detection with a frequency-based charge controller for plug-in hybrid electric vehicles (PHEV) and battery electric vehicles (BEV). A frequency of the power grid is continuously monitored and compared to a predefined tolerance band by a frequency sensor. Responsive to the frequency being outside the predefined tolerance band, the frequency is applied to a programmable logic controller. The programmable logic controller uses the applied frequency to identify a control action. A charge controller and a switch coupled to a battery charger for plug-in hybrid electric vehicles (PHEV) and battery electric vehicles (BEV) and the programmable logic controller receive respective identified control actions for controlling the battery charger.

In accordance with features of the invention, the programmable logic controller sets an action flag that is used together with the applied frequency to identify a control action and a change in the control action.

In accordance with features of the invention, when the applied frequency is within a first frequency range, normal operation of the battery charger is provided by the programmable logic controller. When the applied frequency is within a second frequency range, reduced level of charge current of the battery charger is provided by the programmable logic controller, and the action flag is set to one. When the applied frequency is less than a first set threshold value, the switch is opened and the action flag is set to two, stopping operation of the battery charger. When the applied frequency is less than a second set threshold value and the action flag is two, the switch remains opened, with operation of the battery charger stopped. When the frequency is within a third frequency range, reduced level of charge current of the battery charger is provided by the programmable logic controller, and the action flag is set to one. When the frequency is within a fourth frequency range and the action flag is one or two, charging is returned to normal operation of the battery charger by the programmable logic controller, and the action flag is set to zero. When the frequency is above the fourth frequency range and the action flag is zero, normal operation of the battery charger is provided by the programmable logic controller.

In accordance with features of the invention, the programmable logic controller sets the reduced level of charge current of the battery charger, for example to a 50% level of normal. The programmable logic controller opens the switch, stopping operation of the battery charger when the applied frequency is less than, for example 59.5 Hz with a 60 Hz nominal frequency of the power grid. The programmable logic controller resumes charging to the 50% level of normal when the applied frequency increases above for example 59.7 Hz. The programmable logic controller resumes charging to normal operations when the applied frequency increases to the nominal 60 Hz.

In accordance with the invention, demand response and regulation service to the power grid is provided from the demand side by controlling the charging load of PHEV and BEV. The frequency sensing charge controller automatically responds to changes in power grid frequency by decreasing or increasing the power draw of PHEV and BEV as necessary. Its operation is completely automatic, without the need for any signals or communications from the utility dispatch center. Therefore, for providing the regulation service it does not require expensive equipment for two-way power flows and the communication system with the utility dispatch center. The frequency-based charging method is inherently safe, secure, and not vulnerable to cyber or other threats to the power grid. By providing demand response and regulation service from the demand side, the present invention complements the supply-side regulation performed by electric utilities and provides for safer and more reliable operation of the power grid.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 is a diagram illustrating exemplary actions by a programmable logic controller (PLC) of the exemplary apparatus of FIG. 1 for implementing demand response and regulation services to power grid using frequency detection with a frequency-based charge controller for plug-in hybrid electric vehicles (PHEV) and battery electric vehicles (BEV) in accordance with the preferred embodiment.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, frequency responsive charging for plug-in hybrid electric vehicles (PHEV) and battery electric vehicles (BEV), a frequency sensing charging system and a method are provided for implementing demand response and regulation services to an associated power grid using frequency detection with a frequency-based charge controller for plug-in hybrid electric vehicles (PHEV) and battery electric vehicles (BEV).

In accordance with features of the invention, the frequency sensing charging system automatically responds to changes in power grid frequency by decreasing or increasing the power draw as necessary. For example, should the frequency drop below a certain threshold, the charging system will sense the drop and the charger stops charging or reduces the charging current or power draw from the power grid. When the disturbance has passed and the system frequency has been restored, the charger will resume charging or increase the power draw again. The operation is completely automatic whenever a vehicle is being charged and is compatible with any underlying smart charging schemes that might be in place. The frequency sensing charging system works with any type of PHEV or BEV.

Figure 1:
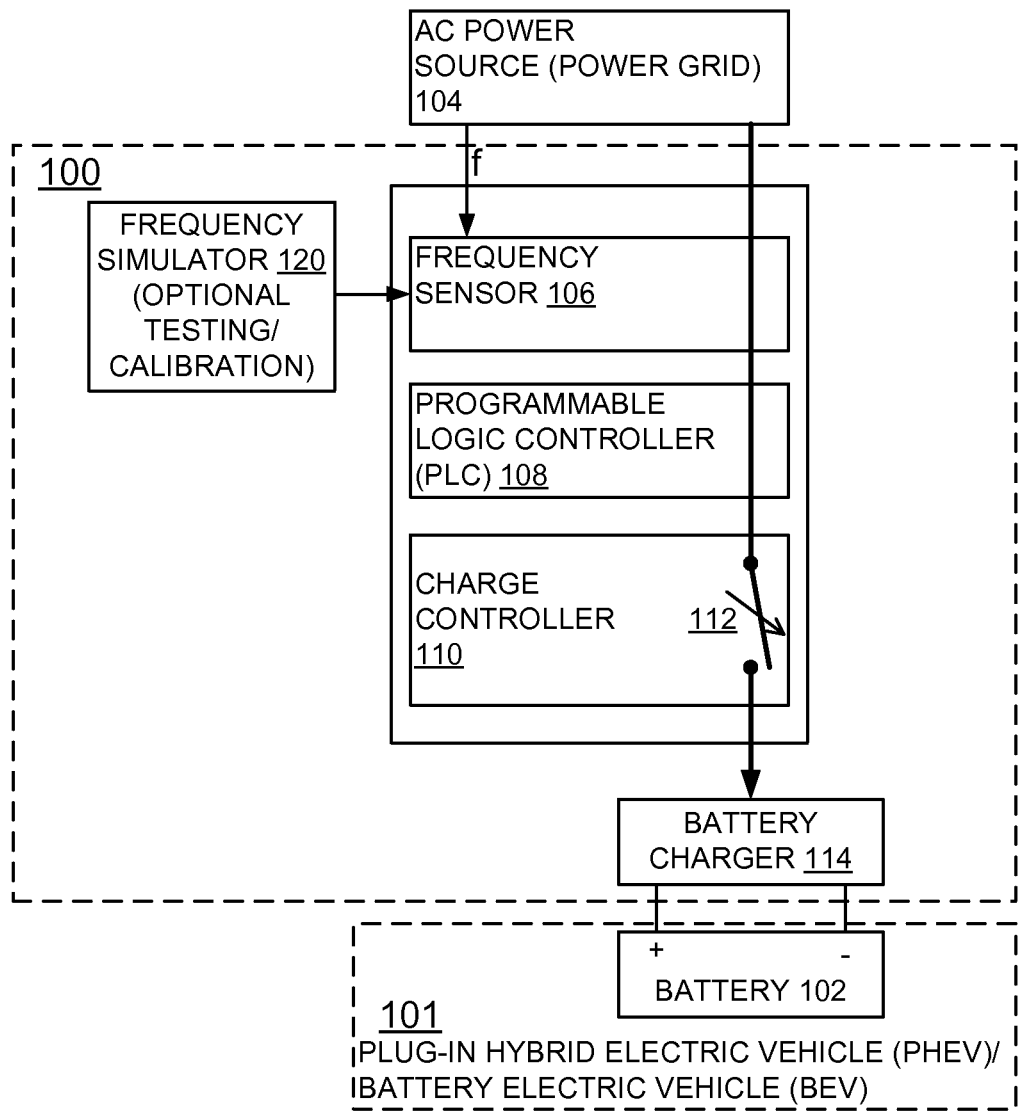
FIG. 1 is a block diagram illustrating exemplary system and apparatus for implementing demand response and regulation services to power grid using frequency detection with a frequency-based charge controller for plug-in hybrid electric vehicles (PHEV) and battery electric vehicles (BEV) in accordance with the preferred embodiment.

Having reference now to the drawings, in FIG. 1, there is shown exemplary apparatus or system generally designated by the reference character 100 for implementing demand response and regulation services to power grid using frequency detection for plug-in hybrid electric vehicles (PHEV) and battery electric vehicles (BEV) 101 in accordance with the preferred embodiment.

The apparatus or system 100 provides frequency responsive charging for a battery 102 of plug-in hybrid electric vehicles (PHEV) and battery electric vehicles (BEV) 101. The apparatus or system 100 includes a frequency sensor 106 receiving a frequency input labeled f from an associated AC power source 104.

The frequency f of the power grid is continuously monitored and compared to a predefined tolerance band, such as 59.9 Hz<f<60.1 Hz, with a 60 Hz nominal frequency of the power grid 104 by the frequency sensor 106. Responsive to the frequency being outside the predefined tolerance band, the frequency is applied to a programmable logic controller (PLC) 108.

The programmable logic controller 108 uses the applied frequency f to identify a control action, for example, as illustrated and described with respect to FIG. 3. The appropriate control action depends on the depth of the frequency drop. A charge controller 110 and a switch 112 are coupled to a battery charger 114 for charging the battery 102 of plug-in hybrid electric vehicles (PHEV) and battery electric vehicles (BEV). The programmable logic controller 108 provides respective identified control actions to the charge controller 110 and switch 112 for controlling the battery charger 114.

In accordance with features of the invention, the programmable logic controller 108 sets an action flag status that is used together with the applied frequency f to identify a control action and a change in the control action to be applied to the charge controller 110 and switch 112 for controlling the battery charger 114. The apparatus or system 100 includes a frequency simulator 120 optionally used for testing and calibration.

Figure 2:
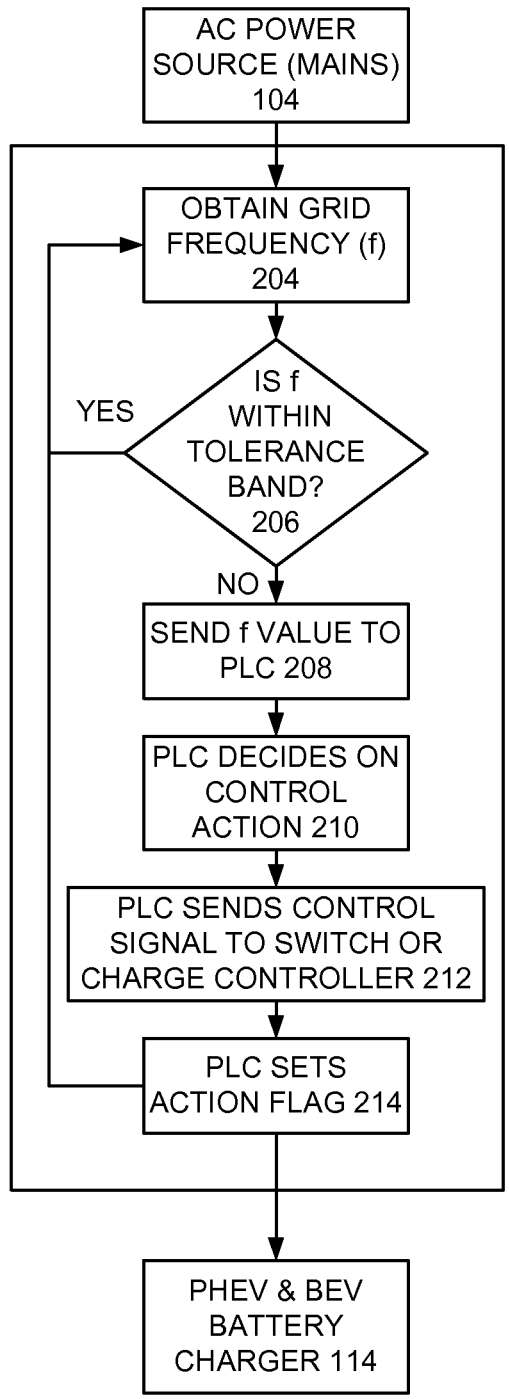
FIG. 2 is a flow chart illustrating exemplary steps for implementing a method to automatically respond to changes in power grid frequency by decreasing or increasing the power draw from an associated power grid in accordance with the preferred embodiment.

Referring also to FIG. 2, there are shown exemplary process steps in accordance with the preferred embodiment. As indicated at a block 204, the grid frequency is obtained and is continuously monitored from the AC power source or power grid 104.

As indicated at a decision block 206, the frequency f of the power grid is compared to a predefined tolerance band, such as 59.9 Hz<f<60.1 Hz, with a 60 Hz nominal frequency of the power grid 104 by the frequency sensor 106. As indicated at a block 208, responsive to the frequency being outside the predefined tolerance band, the frequency is applied to a programmable logic controller (PLC) 108.

As indicated at a block 210, the programmable logic controller (PLC) 108 decides on a control action, which is identified for example, as illustrated and described with respect to FIG. 3. The programmable logic controller (PLC) 108 sends a control signal to the switch 112 or the charge controller 110, as indicated at a block 212. As indicated at a block 214, the programmable logic controller (PLC) 108 sets the action flag. The battery charger 114 for the PHEV and BEV receives the control from the charge controller 110 or is stopped by the switch 112 being opened.

In accordance with features of the invention, the frequency sensing charging system 100 typically provides short stops or reductions in charging power that only slightly increase the total charging time for vehicle batteries 102, while providing an extremely valuable demand response and regulation service to the power grid 104.

Referring to FIG. 3, there are shown example operations generally designated by the reference character 300 by the programmable logic controller (PLC) 108 for implementing demand response and regulation services to power grid using frequency detection with a frequency-based charge controller 110 for plug-in hybrid electric vehicles (PHEV) and battery electric vehicles (BEV) in accordance with the preferred embodiment.

In FIG. 3, there are shown example grid frequencies f 302, together with a respective action flag status 304 and exemplary actions 306 provided by the programmable logic controller (PLC) 108 of the exemplary apparatus 100.

When the applied grid frequency f 302 is within a first frequency range, such as a predefined tolerance band, such as 59.9 Hz<f<60.1 Hz, with a 60 Hz nominal frequency of the power grid 104, and the action flag status 304 is zero, normal operation 306 of the battery charger is provided by the programmable logic controller 108, for example fully charging if needed, and the action flag status 304 remains zero.

When the applied frequency f 302 is within a second frequency range, such as a predefined range 59.5 Hz<f<59.9 Hz, and the action flag status 304 is zero, a PLC action 306 to reduce the level of charge current of the battery charger is provided by the programmable logic controller 108, and the action flag status 304 is set to one.

When the applied frequency f 302 is less than a first set threshold value, such as f<59.5 Hz, and the action flag status 304 is zero, the switch 112 is opened stopping operation of the battery charger 114 and the action flag status 304 is set to two.

When the applied frequency f 302 is less than a second set threshold value such as f<59.7 Hz, and the action flag status 304 is two, no action is required with operation of the battery charger already stopped.

When the frequency f 302 is within a third frequency range, such as 59.7 Hz<f<60.0 Hz, and the action flag status 304 is two, the switch 112 is closed, and charging at the reduced level, such as 50% of charge current of the battery charger 114 is provided by the programmable logic controller 108, and the action status flag 304 is set to one.

When the frequency is within a fourth frequency range, such as 60.0 Hz<f<60.1 Hz, and the action flag status 304 is one or two, charging is returned to normal operation of the battery charger 114 by the programmable logic controller 108, and the action flag status 304 is set to zero.

When the frequency is above the fourth frequency value, such as 60.1 Hz, and the action flag status 304 is zero, normal operation of the battery charger is continued by the programmable logic controller 108.

In brief, the programmable logic controller 108 sets the reduced level of charge current of the battery charger, for example to a 50% level of normal when the grid frequency is within a selected predefined range, such as 59.5 Hz<f<59.9 Hz. The programmable logic controller 108 opens the switch, stopping operation of the battery charger when the applied frequency from the power grid is less than, for example 59.5 Hz. The programmable logic controller 108 resumes charging to the 50% level of normal when the applied frequency increases above, for example 59.7 Hz. The programmable logic controller 108 resumes charging to normal operations when the applied frequency increases to the nominal 60 Hz.

While the present invention has been described with reference to the details of the embodiments of the invention shown in the drawing, these details are not intended to limit the scope of the invention as claimed in the appended claims.

What is claimed is:

1. A method for implementing demand response and regulation services to an associated power grid used with a battery charger for plug-in hybrid electric vehicles (PHEV) and battery electric vehicles (BEV) comprising:

providing a frequency sensor for continuously monitoring frequency of the power grid and comparing the monitored frequency to a predefined tolerance band;

providing a programmable logic controller coupled to said frequency sensor;

providing a charge controller and a switch coupled to said programmable logic controller and the battery charger;

said frequency sensor, responsive to the frequency being outside the predefined tolerance band, applying the frequency to said programmable logic controller;

said programmable logic controller using the applied frequency and identifying a control action; and said charge controller and switch receiving respective identified control actions from said programmable logic controller for controlling the battery charger.

2. The method as recited in claim 1 includes said programmable logic controller using the applied frequency and setting an action flag; said action flag being used together with the applied frequency to identify a change in the control action.

3. The method as recited in claim 1 wherein said programmable logic controller, responsive to the applied frequency being within a first frequency range, provides normal operation of the battery charger.

4. The method as recited in claim 1 wherein said programmable logic controller, responsive to the applied frequency being within a second frequency range, reduces a level of charge current, and sets an action flag to one.

5. The method as recited in claim 1 wherein said programmable logic controller, responsive to the applied frequency being less than a first set threshold value, opens said switch and sets an action flag to two, stopping operation of the battery charger.

6. The method as recited in claim 5 wherein said programmable logic controller, responsive to the applied frequency being less than a second set threshold value and an action flag is two, the switch remains opened, with operation of the battery charger stopped.

7. The method as recited in claim 5 wherein said programmable logic controller, responsive to the applied frequency being within a third frequency range, resumes reduced level of charge current of the battery charger and set an action flag to one.

8. The method as recited in claim 1 wherein said programmable logic controller, responsive to the applied frequency being within a fourth frequency range and the action flag is one or two, provides normal operation of the battery charger and sets an action flag to zero.

9. The method as recited in claim 1 wherein said programmable logic controller, responsive to the applied frequency being above the fourth frequency range and the action flag is zero, provides normal operation of the battery charger.

10. The method as recited in claim 1 includes a nominal frequency of the power grid is 60 Hz, and said programmable logic controller sets the reduced level of charge current of the battery charger to a 50% level of normal current charge responsive to the applied frequency within a predefined range between 59.5 Hz<f<59.9 Hz.

11. The method as recited in claim 10 wherein said programmable logic controller opens said switch, stopping operation of the battery charger responsive to the applied frequency being less than 59.5 Hz.

12. The method as recited in claim 11 wherein said programmable logic controller sets charging to the 50% level of normal responsive to the applied frequency increases above 59.7 Hz.

13. The method as recited in claim 11 wherein said programmable logic controller resumes charging to normal operations responsive to the applied frequency increases to the nominal 60 Hz.

14. A system for implementing demand response and regulation services to an associated power grid with charging a battery of plug-in hybrid electric vehicles (PHEV) and battery electric vehicles (BEV) comprising:

a frequency sensor continuously monitoring frequency of the power grid and comparing to a predefined tolerance band;

a programmable logic controller coupled to said frequency sensor;

a charge controller and a switch coupled to said programmable logic controller;

a battery charger coupled to said charge controller and said switch and the battery;

said frequency sensor responsive to the frequency being outside the predefined tolerance band, applying the frequency to said programmable logic controller;

said programmable logic controller using the applied frequency and identifying a control action; and said charge controller and switch receiving respective identified control actions by said programmable logic controller for controlling the battery charger.

15. The system as recited in claim 14 further includes said programmable logic controller setting an action flag responsive to the applied frequency; said action flag being used together with the applied frequency to identify a change in the control action.

16. The system as recited in claim 14 wherein said programmable logic controller, responsive to the applied frequency being within a first frequency range, provides normal operation of the battery charger.

17. The system as recited in claim 14 wherein said programmable logic controller, responsive to the applied frequency being within a second frequency range, reduces a level of charge current.

18. The system as recited in claim 14 wherein said programmable logic controller, responsive to the applied frequency being less than a first set threshold value, opens said switch, stopping operation of the battery charger.

19. The system as recited in claim 18 wherein said programmable logic controller, responsive to the applied frequency being within a third frequency range, resumes the reduced level of charge current of the battery charger.

20. The system as recited in claim 19 wherein said programmable logic controller, responsive to the applied frequency being within a fourth frequency range, resumes normal operation of the battery charger.

* * * * *